(12) United States Patent
Cox et al.

(10) Patent No.: US 9,290,144 B1
(45) Date of Patent: Mar. 22, 2016

(54) SENSOR BASED VEHICLE FLOTATION DEVICE

(71) Applicants: Matthew John Cox, McLean, VA (US); Rohit Anant Narayanan, McLean, VA (US); Alexander Zhang Yu, Vienna, VA (US); Angela Mingjia Wei, McLean, VA (US)

(72) Inventors: Matthew John Cox, McLean, VA (US); Rohit Anant Narayanan, McLean, VA (US); Alexander Zhang Yu, Vienna, VA (US); Angela Mingjia Wei, McLean, VA (US)

(*) Notice: Subject to any disclaimer, the term of this patent is extended or adjusted under 35 U.S.C. 154(b) by 0 days.

(21) Appl. No.: 14/534,138

(22) Filed: Nov. 5, 2014

(51) Int. Cl.
*B60R 22/00* (2006.01)
*B60R 21/01* (2006.01)
*B63B 7/08* (2006.01)
*B60R 21/00* (2006.01)

(52) U.S. Cl.
CPC . *B60R 21/01* (2013.01); *B63B 7/08* (2013.01); *B60R 2021/0016* (2013.01); *B60R 2021/01286* (2013.01)

(58) Field of Classification Search
CPC ................... B63B 43/00; B63B 43/14
USPC .............................. 701/45; 340/623; 114/123
See application file for complete search history.

(56) References Cited

U.S. PATENT DOCUMENTS

| | | | |
|---|---|---|---|
| 3,011,184 A | 12/1961 | Curcio | |
| 6,595,359 B1 | 7/2003 | Allain | |
| 7,287,482 B1 * | 10/2007 | Banchetto et al. | 114/123 |
| 8,695,521 B2 * | 4/2014 | Dondurur et al. | 114/68 |
| 2008/0243342 A1 * | 10/2008 | Breed | 701/45 |
| 2009/0078183 A1 * | 3/2009 | Heinermann | 114/69 |

* cited by examiner

*Primary Examiner* — Luke Huynh

(57) ABSTRACT

A sensor based vehicle flotation device is suitable for floating a vehicle immersed in sufficient water to activate a protected water sensor and, if desired, to confirm through auxiliary sensors whether a hazardous condition is presented. When such a device detects and verifies that the vehicle is becoming immersed in water, one or more expansible chambers, affording sufficient buoyancy to allow the vehicle to float, automatically and rapidly inflate by means of compressed, pumped or pressurized gas. Upon the successful deployment of the expansible chamber, the land vehicle will begin to float, limiting water damage to the vehicle and/or bodily harm to its occupants, and reducing the risk of the vehicle overturning. The expansible chamber will remain inflated until the land vehicle is returned to safety, and the device is detached from the land vehicle.

22 Claims, 6 Drawing Sheets

SENSOR BASED VEHICLE FLOTATION DEVICE

BACKGROUND OF THE INVENTION

The present invention relates to vehicle safety technologies, and particularly to a device attached to a land vehicle that will, upon the vehicle being immersed or submerged in water, sense the unsafe condition and safely float the vehicle. The present invention is suitable for use in any type of land vehicle, particularly sedans, sport utility vehicles, pickups or other trucks, motorcycles or any other motorized vehicles.

Even a small amount of water running under a land vehicle, potentially from a flash flood or an unexpectedly deep stream, may cause the driver to lose control of the vehicle, or overturn or carry away the vehicle. Similar accidents may occur when a land vehicle falls off of a bridge into a river or skids or is driven into a flooded roadside ditch, lake or other body of water.

Prior land vehicle flotation devices have addressed the need to move a stranded vehicle or to create a water transportation device with wheels by inflating a raft underneath the vehicle through a valve connected to a mechanically operated exterior air pressure source. While these devices provide for vehicle flotation, they do not combine multi-function sensor or multiple sensor technology to automatically activate the flotation units, and even where a water sensor is incorporated, they lack substantial protection for the water sensing mechanism through design and/or placement. Under many conditions, reliance solely on an unprotected water sensor, especially one without a method to disable operation, has severe limitations and risks. The sensor could easily malfunction if water reaches it in otherwise safe situations, such as where there is splashing from rain or driving through a puddle or even spray at a carwash. Another solution relies on multiple flotation units that wrap individually around the tires of a land vehicle and are designed for both inflation and deflation. This solution has inherent stabilization risks if even one subsystem fails to deploy in an emergency causing unequal stabilization across the vehicle. Further, if the deflation system of these devices were initiated prior to the land vehicle being returned to safety, both the land vehicle and any occupants are returned to danger.

Therefore, we have developed the present invention, meant to provide a solution to these and similar problems by incorporating the union of different methods of automatic sensing of vehicle or ambient conditions, with rapid and stable deployment, or the union of a single, but well-protected, method of automatic sensing of vehicle or ambient conditions, with rapid and stable deployment. The protected water sensor technology and multi-function sensor and/or multiple sensor technology of the present invention provide a safe and more effective solution for land vehicle water immersion with a low risk of false readings and accidental deployment.

SUMMARY OF THE INVENTION

The Sensor Based Vehicle Flotation Device is suitable for floating any type of vehicle, particularly land vehicles such as sedans, sport utility vehicles, pickups or other trucks, motorcycles, or any other motor vehicles in any instance in which the vehicle is immersed in a sufficient amount of water to activate a protected water sensor and, if desired, to provide information to one or more additional sensors to confirm that the water sensed by the first sensor presents a hazardous condition. During normal operation of a land vehicle equipped with a Sensor Based Vehicle Flotation Device, the Sensor Based Vehicle Flotation Device is attached to the vehicle and dormant. However, when the Sensor Based Vehicle Flotation Device detects and verifies that the land vehicle is becoming immersed in water, one or more expansible chambers (such as an air bladder, raft or any other rapidly deployable flotation device) affording sufficient buoyancy to allow the vehicle to float, included within the Sensor Based Vehicle Flotation Device, automatically and rapidly inflate by means of compressed, pumped or pressurized air, carbon dioxide or other inert gas or otherwise. Upon the successful deployment of the expansible chamber, the land vehicle will begin to float, limiting water damage to the vehicle and/or bodily harm to its occupants, and reducing the risk of the vehicle overturning. The expansible chamber will remain inflated until the land vehicle is returned to safety, and the Sensor Based Vehicle Flotation Device is detached from the land vehicle.

These and other features of this invention will become apparent to those skilled in the art upon review of the following specifications and drawings.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF A PREFERRED EMBODIMENT

Figure 1A:
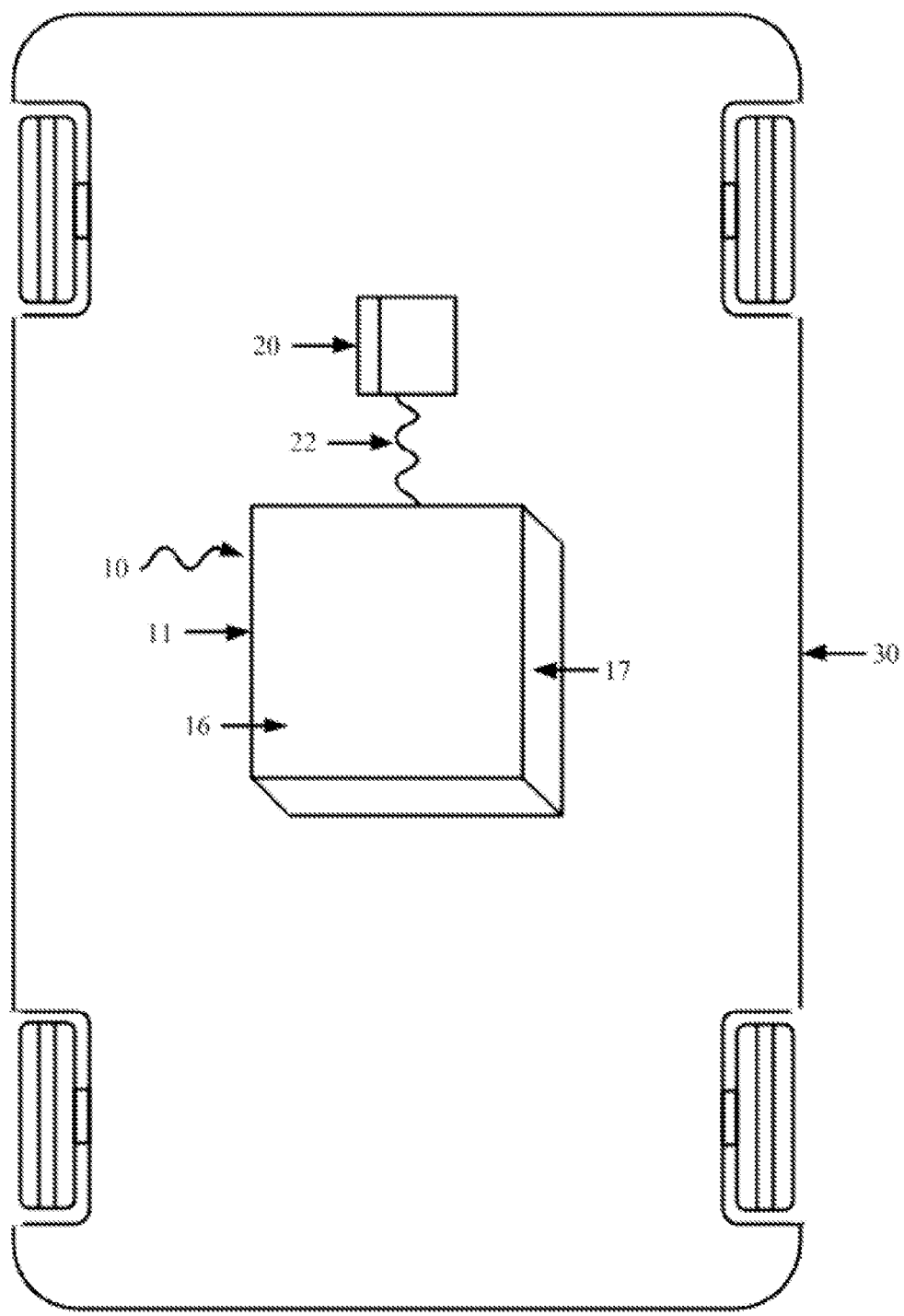
FIG. 1A is the undeployed Sensor Based Vehicle Flotation Device, with a single sensor module placed outside the expansible chamber module housing, along with the land vehicle to which the Sensor Based Vehicle Flotation Device is attached, all from the perspective of the underside of the land vehicle. Note that most detail has been omitted from the undercarriage of the land vehicle and that the sensor module could alternatively be embedded within the exterior of the expansible chamber module housing.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is intended to provide a flotation safety device for vehicles. It should be understood that the device may be used to provide flotation safety to many different types of modes of transport and should not be limited in use to only motor vehicles.

The present invention provides an automatically and rapidly deploying expansible chamber, generally referred to in the drawings by the reference number 12, to float a land vehicle 30 in the case of the immersion of the vehicle 30 in a sufficient level of water. The expansible chamber 12 and all of its auxiliary components, with the exception of a sensor module 20, are referenced collectively as the expansible chamber module 10.

Figure 1B:
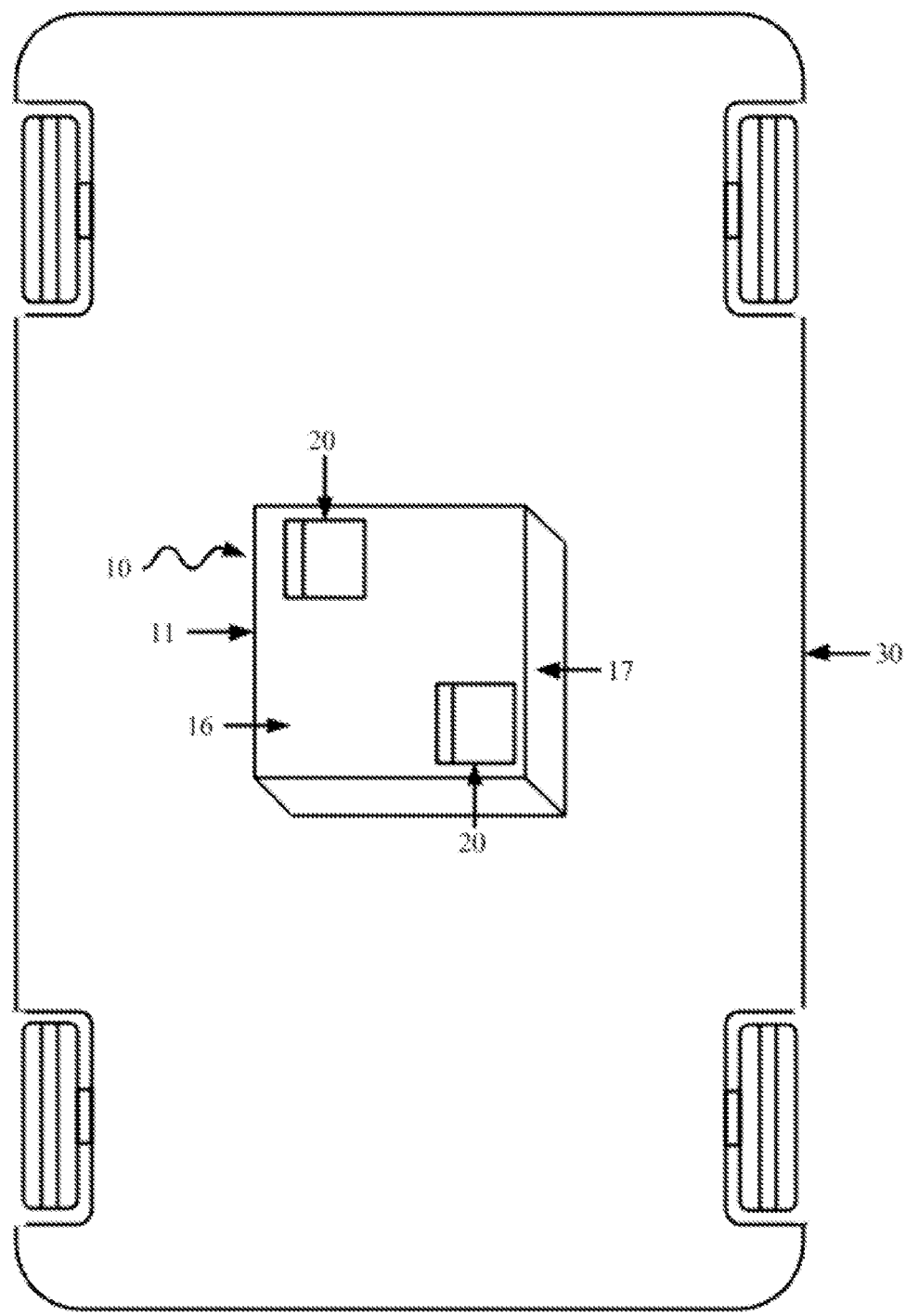
FIG. 1B shows an alternate layout, with dual sensor modules embedded within the exterior of the expansible chamber module housing, from the same perspective as FIG. 1A. Note that one or both of the sensor modules could alternatively be placed outside the expansible chamber module housing.
Figure 2:
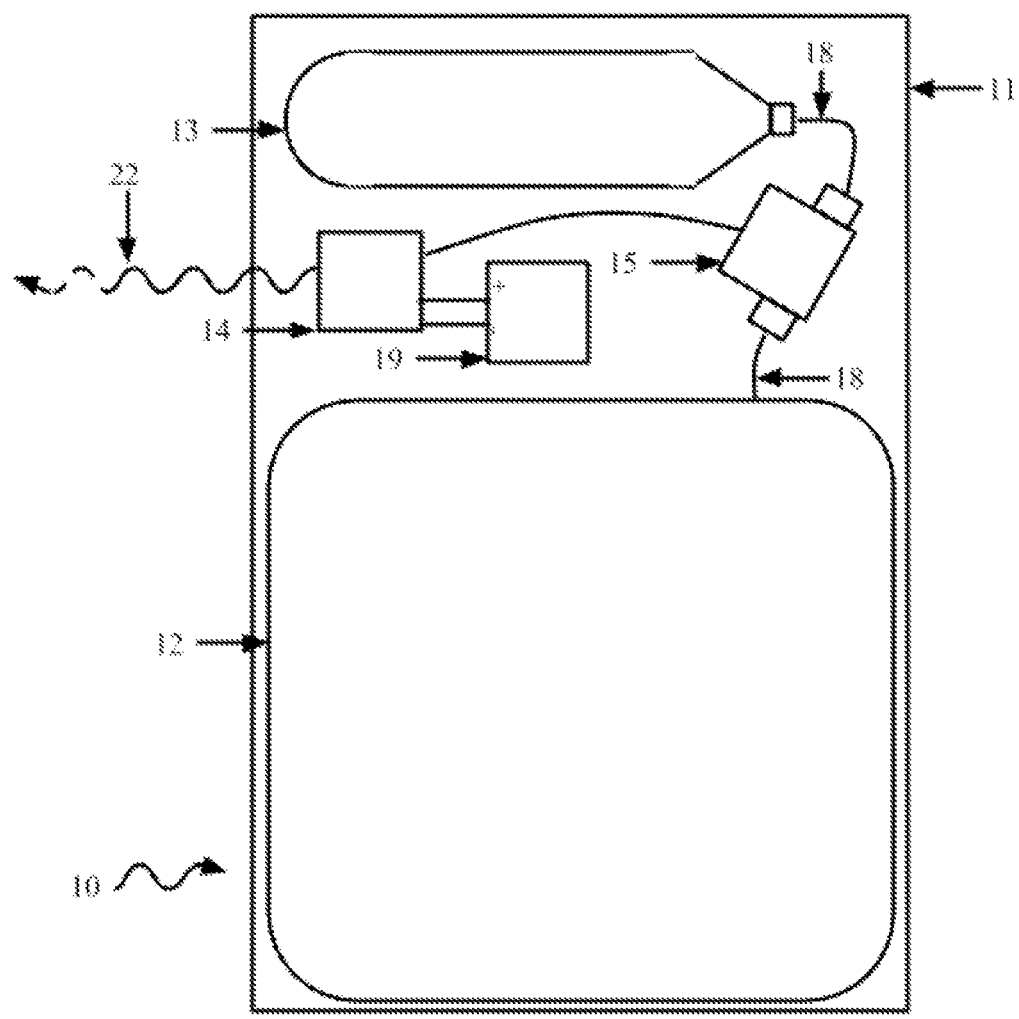
FIG. 2 is a view of the inside of the Sensor Based Vehicle Flotation Device (without the sensor module).

Referring to FIG. 2, the expansible chamber module 10 is comprised of the following elements: an expansible chamber 12 that is packed in a deflated condition into a portion of a housing 11 prior to being deployed, a compressed gas canister 13, a microcontroller 14, a solenoid valve 15, air-tight tubing 18 connecting the compressed gas canister 13 to the solenoid valve 15 and expansible chamber 12, and a power source 19. The housing 11 holds the aforementioned parts and appropriate wiring to connect the various components. The housing 11 is attached to the bottom of the land vehicle 30 (on the exterior) on an after-market basis or by original equipment manufacturer design. Referring to FIG. 1B, the bottom of the expansible chamber module housing 16 is tightly sealed to the side walls of the housing 17 but should be attached by break-away tabs, bolts or other means sufficient to withstand normal driving, bouncing, bumps and the like, while capable of allowing the bottom of the housing 16 to separate from the side walls of the housing 17 upon deployment of the expansible chamber 12. The power source 19 may be a battery or battery pack. Alternatively, a battery or alternator included elsewhere within the land vehicle 30 could be used as a power source 19 (in which case, the power source would not be contained in the housing 11, but would be connected by electrical wiring as applicable). The expansible chamber 12 itself would, when inflated, extend beyond the sides, front and back of the land vehicle 30 in order to provide stability, and could, if desired, extend up along the sides and/or front and back of the land vehicle 30 for additional stability and protection.

Figure 3A:
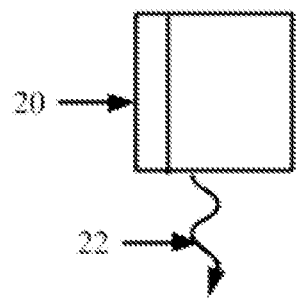
FIG. 3A depicts a view of a sensor module from the bottom.
Figure 3B:
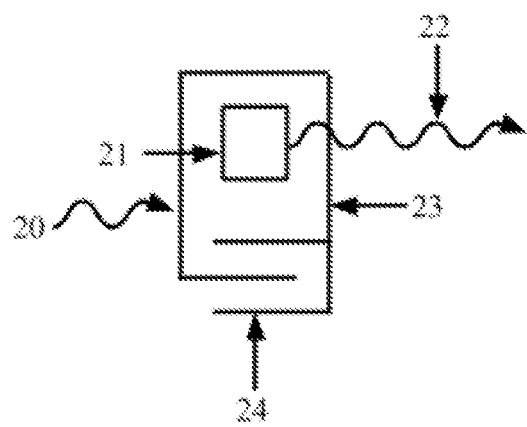
FIG. 3B depicts a side cutaway view of a sensor module containing a water sensor.
Figure 3C:
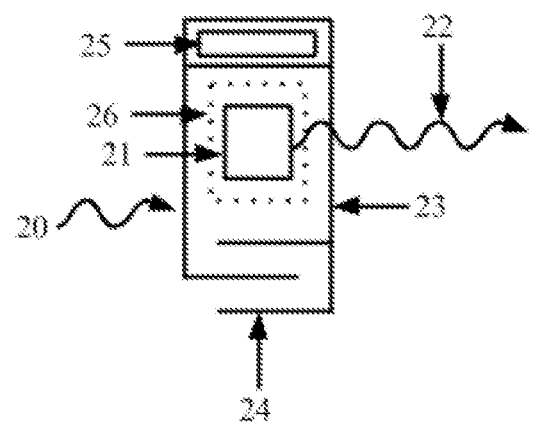
FIG. 3C depicts a side cutaway view of a sensor module containing a water sensor, shielded by micro-screening, and one auxiliary sensor.

In the preferred embodiment, and with reference to FIG. 3C, the sensor module 20 is comprised of a water sensor 21, a protective housing 23 for the water sensor 21, and wiring 22 connecting the water sensor 21 to the microcontroller 14, along with an auxiliary sensor 25 for detecting vehicle or ambient conditions located either within the sensor module 20 itself or elsewhere in or on the vehicle 30. The water sensor 21 must be able to rapidly and accurately sense the presence of water. Those skilled in the art will recognize that the water sensor 21 may be an electrical conductivity/impedance-type sensor or an infrared moisture sensor (but due to its function, it would not be desirable for it to have the sensitivity of an atmospheric moisture sensor). The housing 23, including its placement, limits the amount of water that can get to the water sensor 21 through incidental splashing, spraying, seepage and the like through baffles or other barriers 24 included in the design, micro-screening 26 or other methods, and thus limits the potential for false readings. Baffles 24, if used, would limit the potential for splashed or sprayed water to reach the water sensor 21. Micro-screening 26, if used, would require that a minimum pressure be reached for water to pass through the barrier and reach the water sensor 21. This might be useful to distinguish, for example, still and flowing water. Flowing water is more dangerous to a driver, and would also exert more pressure on the micro-screening 26, forcing its way through.

Wiring 22 also connects the auxiliary sensor 25 to the microcontroller 14. The auxiliary sensor 25 may or may not be co-located with the water sensor 21 and may or may not be housed within the protective housing 23. When the water sensor 21 detects sufficient water to materially impact normal operation of the land vehicle 30 (a minimum threshold level that could be different depending on the factors such as make and model of the vehicle in question and the weight or speed of the vehicle at the time of detection), and the auxiliary sensor 25 confirms that hazardous condition, the microcontroller 14 will send a signal to the solenoid valve 15 causing the compressed gas from the canister 13 to flow through the tubing 18 into (and inflating) the expansible chamber 12. (Depending on various specifications, amplification of the signal may be necessary through a transistor, relay, or the like.) When the expansible chamber 12 begins to inflate, the cover on the bottom of the housing 16 will break away and allow the expansible chamber 12 to fully inflate, floating the land vehicle 30.

The auxiliary sensor 25 may sense a variety of vehicle or ambient conditions, such as pressure, angular rate, angular velocity, acceleration, linear rate, linear velocity, motion, slippage, chassis strain or flow, and can be used to gauge pressure, ground traction, direction, or other vehicle and ambient conditions to verify that the water sensed by the water sensor 21 presents a hazardous condition or whether it is more likely to be a false reading. A positive water sensor 21 reading would cause the microcontroller 14 to read the auxiliary sensor 25 and evaluate its data compared to the safety threshold applicable to the type of auxiliary sensor 25 in use (given other relevant factors such as make and model of the vehicle in question and the weight or speed of the vehicle at the time of measurement) in combination with the data of the water sensor 21. Other combinations of signal analysis are equally effective for evaluating the hazards surrounding the land vehicle 30. Through the multi-sensor analysis, the microcontroller 14 determines whether the land vehicle 30 is actually in water, and thus, whether the expansible chamber 12 should deploy.

For example, if a pressure sensor were used as an auxiliary sensor 25, the pressure sensor could sense the pressure exerted by the frame of the land vehicle 30 on the wheels and/or by the wheels on the ground, either of which would presumably be less if the land vehicle 30 were beginning to float or were being swept away by water.

If a strain gauge were used as an auxiliary sensor 25, the strain gauge could sense pressure or torsion on the land vehicle 30 frame, which could, beyond a minimum threshold and with the water sensor 21 reading, indicate an abrupt change in direction, impact or spin.

If one or more slippage, gyroscopic, angular rate, angular velocity, accelerometer, linear rate, linear velocity, motion, flow or pitot tube sensors were used as auxiliary sensors 25, they too could be used in several ways. For example, those sensors may directly sense side slippage of the wheels or measure relative wheel speed—either from wheel to wheel or analyzing speedometer data relative to ground speed. Such sensors could also capture abrupt changes in direction, spinning, sideways motion (e.g., angular rate, angular velocity, acceleration, linear rate or linear velocity), or the like, as compared to recent movement, and transmit such information to the microcontroller 14 to confirm that the water sensed by the water sensor 21 presents a hazardous condition.

Regardless of the sensor type (or combination of sensor types) employed in the Sensor Based Vehicle Flotation Device, the microcontroller 14 should account for weight, speed, load, and other various factors, in order to trigger deployment of the expansible chamber 12 once certain thresholds have been met based on those factors. The thresholds should be such that conditions which exceed such thresholds are likely to eliminate or materially reduce the driver's control of the land vehicle 30 or carry the land vehicle 30 away entirely.

If desired, the present invention may include multiple (i.e., redundant) sensor modules 20 containing water sensors 21 as in FIG. 1B, or solely redundant auxiliary sensors 25 to sense multiple conditions from multiple locations. In the case of a single sensor module 20 showing a false positive reading, failing or otherwise becoming dysfunctional, one or more redundant sensor modules 20, as in FIG. 1B, could mitigate the error and allow normal operation to continue. Under a redundant sensor module 20 system, as in FIG. 1B, in a preferred embodiment, most or all modules would need to attain a pre-determined level of concurrence in order for the expansible chamber 12 to deploy.

If desired, the sensor module 20 need not be set apart from the expansible chamber module 10; instead, it can be incorporated into the outside side or bottom of the expansible chamber module housing 11, as in FIG. 1B, and thus be shielded from splashing, spraying, rocks, debris and the like, and potentially less likely to have false readings, presumably without a change in performance.

If desired, the present invention may include a means for the driver or a passenger of the land vehicle 30 to positively (i.e., activating the expansible chamber inflation if inactive) or negatively (i.e., deactivating the system) override the sensor module 20. An override means permits the land vehicle 30 operator or passenger to control the present invention in unusual driving circumstances, such as intentional off-road driving with a 4-wheel drive vehicle, or if the expansible chamber 12 were mistakenly inflating. Although the override means reduces the autonomy of the invention, an override means could prove a useful and potentially life-saving feature in the case of a malfunctioning sensor.

If desired, when conditions are safe for driving and/or the expansible chamber 12 is no longer necessary after having been deployed, there can be a means for detaching from the land vehicle 30 (if attached) and/or deflating the expansible chamber 12.

If desired, the compressed gas canister 13 and solenoid valve 15 can be replaced with an electric air pump or compressor. However, while rapid inflation is intended, the present invention should not require instantaneous inflation such as that used in airbag systems via pyrotechnic means. The use of pyrotechnic means could, in fact, be extremely dangerous given the likely placement of the housing 11 near the fuel lines and fuel tank of the land vehicle 30.

Figure 4A:
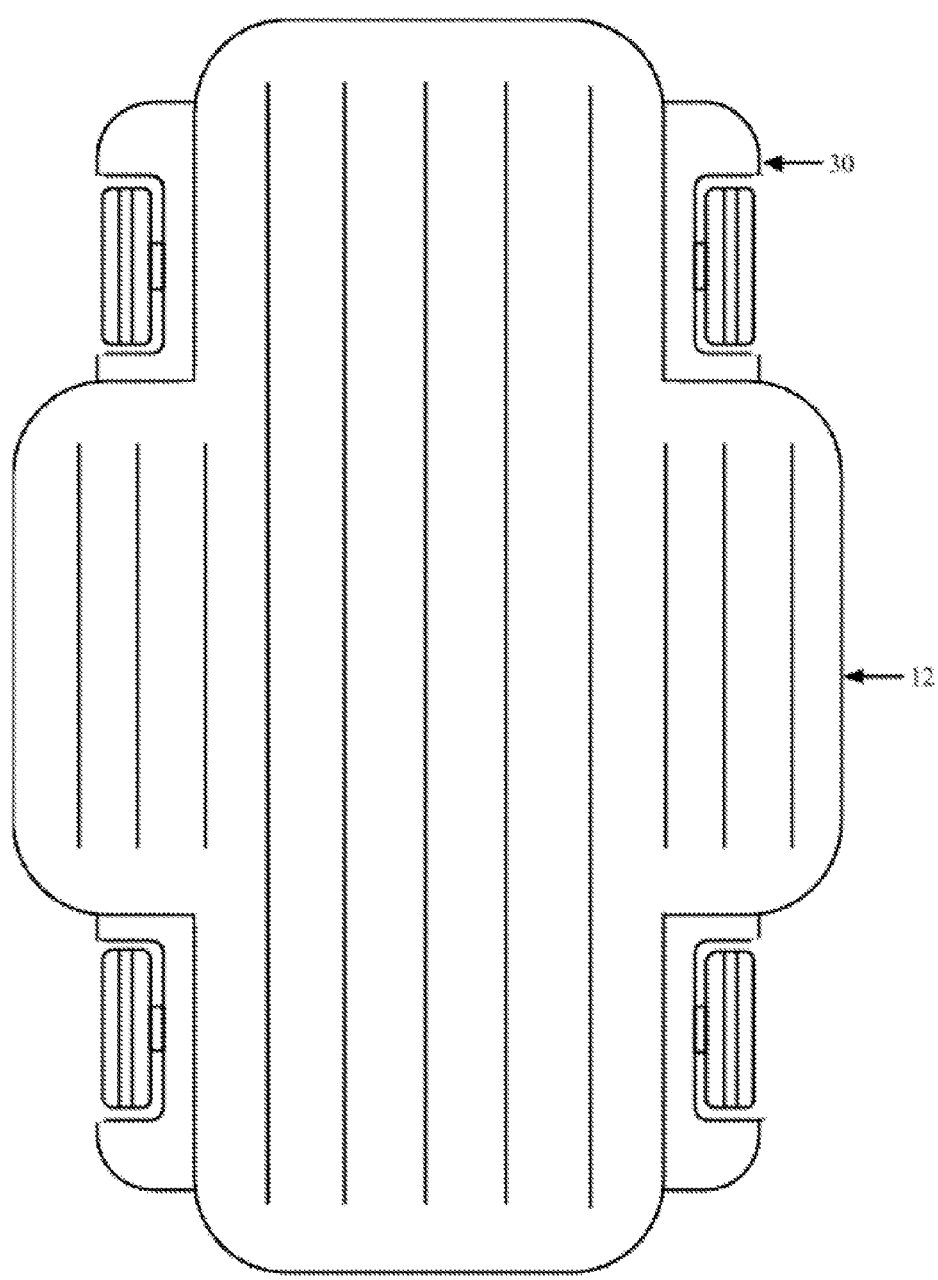
FIG. 4A shows the expansible chamber, fully inflated, from the perspective of the underside of the land vehicle. Note that most detail has been omitted from the exposed portions of the under carriage of the land vehicle.
Figure 4B:
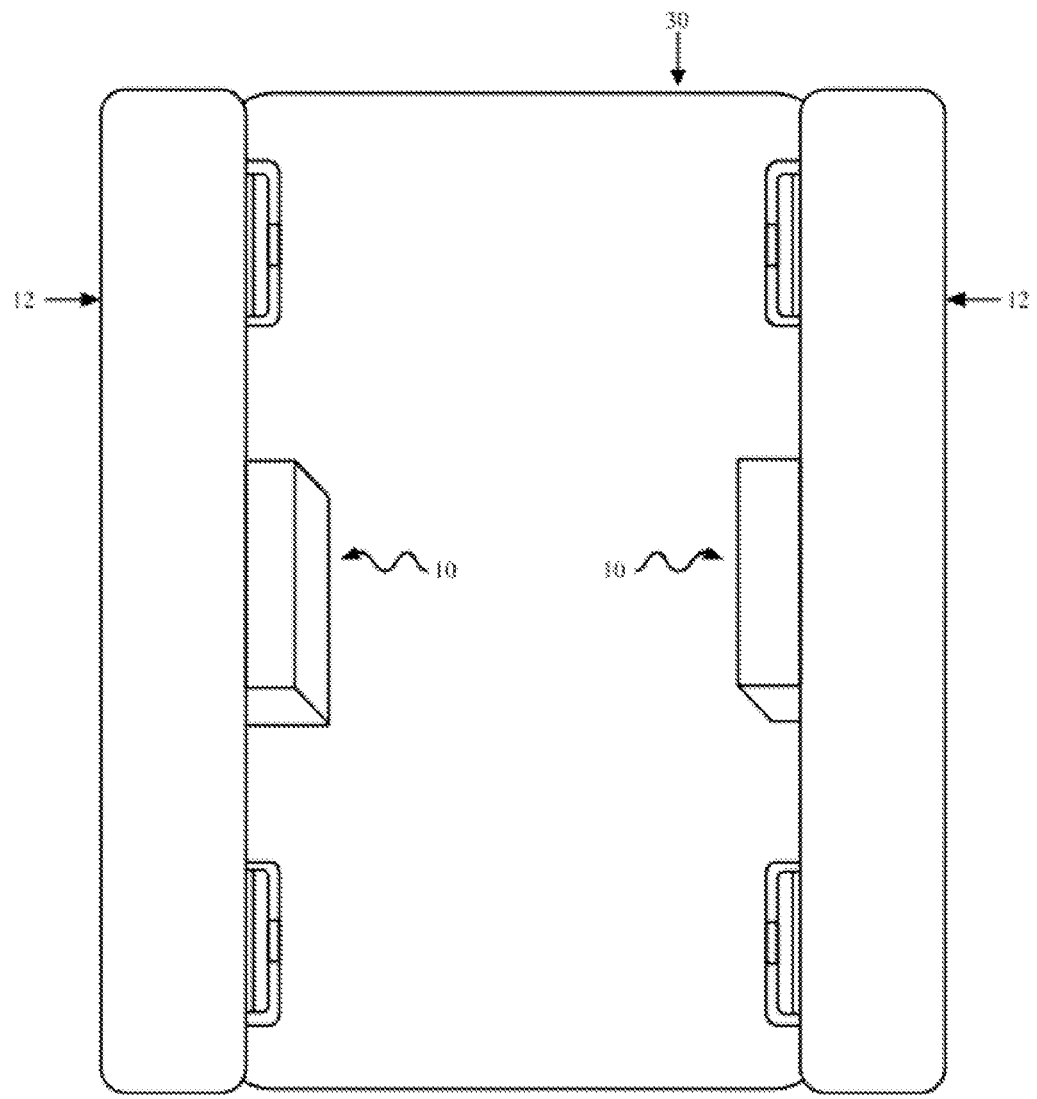
FIG. 4B shows an alternate layout, with a dual/pontoon type expansible chamber system (and dual expansible chamber modules), fully inflated, from the same perspective as FIG. 4A.

If desired, instead of a single expansible chamber 12, there may be a plurality of expansible chambers 12, as depicted in FIG. 4B. In the figure, each expansible chamber is enclosed within a separate module prior to deployment; this need not be the case. Alternatively, the expansible chambers may deploy from the bottoms of the doors.

It is to be understood that the present invention includes any and all embodiments described within the scope of the following claims, and as such is not limited to the scope of the above embodiment, that in the drawings, those embodiments in the Abstract and Summary of the Invention, or any other specific embodiment(s), whether individually or in combination.

What is claimed is:

1. A system, for attachment to a vehicle, comprising:
   a first sensor configured to sense ambient conditions used to determine whether the vehicle is being immersed in water, and outputting signals representative of the ambient conditions;
   an auxiliary sensor configured to sense at least one of vehicle conditions and additional ambient conditions, used in determining whether the water sensed by the first sensor presents a hazardous condition, and outputting signals representative of the vehicle conditions and additional ambient conditions;
   an expansible chamber configured to increase buoyancy of the vehicle when filled with a gas; and
   a controller communicating with the first sensor and the auxiliary sensor and processing the sensor signals to determine whether the vehicle is being immersed in water and whether the immersion in water presents a hazardous condition, the controller causing the expansible chamber to be filled with a gas when the controller determines that the vehicle is being immersed in water and that the immersion in water is a hazardous condition.

2. The system set forth in claim 1, wherein the first sensor comprises at least one of an electrical conductivity sensor, an infrared moisture sensor, and a water sensor.

3. The system set forth in claim 1, wherein the first and auxiliary sensors sense at least one of water presence, water pressure, water speed, vehicle motion, vehicle direction, vehicle acceleration, vehicle strain, and vehicle slippage and the controller compares the signals to at least one threshold value to determine whether the vehicle is being immersed in water.

4. The system set forth in claim 1, wherein the auxiliary sensor is configured to sense at least one of pressure, strain, slippage, angular position, angular velocity, linear position, linear velocity, direction, flow, and fluid speed.

5. The system set forth in claim 1, further comprising a sensor housing that surrounds the first sensor and includes a barrier to restrict communication of the first sensor with the ambient conditions.

6. The system set forth in claim 5, wherein the barrier of the sensor housing includes at least one of baffles and microscreening to restrict an amount of water that can reach the first sensor.

7. The system set forth in claim 1, further comprising at least one of a compressed gas chamber, a pressurized gas chamber, a compressor mechanism, a valve, and an air pump, for rapidly inflating the expansible chamber.

8. The system set forth in claim 1, having at least two expansible chambers.

9. The system set forth in claim 1, wherein the controller is configured to provide means to override the filling of the expansible chamber through at least one of means for activating inflation of the expansible chamber and means for deactivating the system.

10. The system set forth in claim 1, further comprising a mechanism for at least one of detaching the expansible chamber from the vehicle, and deflating the expansible chamber after inflation.

11. A system, for attachment to a land vehicle, comprising:
- a first sensor configured to sense ambient conditions used to determine whether the vehicle is being immersed in water, and outputting signals representative of the ambient conditions;
- a sensor housing that surrounds the first sensor and includes a barrier to restrict communication of the first sensor with the ambient conditions;
- an expansible chamber configured to increase buoyancy of the vehicle when filled with a gas; and
- a controller communicating with the first sensor and processing the first sensor signals to determine whether the vehicle is being immersed in water and whether the immersion in water presents a hazardous condition, the controller causing the expansible chamber to be filled with a gas when the controller determines that the vehicle is being immersed in water and that the immersion in water is a hazardous condition.

12. The system set forth in claim 11, wherein the first sensor comprises at least one of an electrical conductivity sensor, an infrared moisture sensor, and a water sensor.

13. The system set forth in claim 11, wherein the first sensor senses at least one of water presence, and water pressure and the controller compares the signals to at least one threshold value to determine whether the vehicle is being immersed in water.

14. The system set forth in claim 11, further comprising an auxiliary sensor configured to sense at least one of vehicle conditions and additional ambient conditions, used in determining whether the water sensed by the first sensor presents a hazardous condition, and outputting signals representative of the vehicle conditions and additional ambient conditions; and
- wherein the controller also communicates with the auxiliary sensor and processes the auxiliary sensor signals to determine whether the vehicle is being immersed in water and whether the immersion in water presents a hazardous condition.

15. The system set forth in claim 14, wherein the first and auxiliary sensors sense at least one of water presence, water pressure, water speed, vehicle motion, vehicle direction, vehicle acceleration, vehicle strain, and vehicle slippage and the controller compares the signals to at least one threshold value to determine whether the vehicle is being immersed in water.

16. The system set firth in claim 14, wherein the auxiliary sensor is configured to sense at least one of pressure, strain, slippage, angular position, angular velocity, linear position, linear velocity, direction, flow, and fluid speed.

17. The system set forth in claim 11, wherein the barrier of the sensor housing includes at least one of baffles, and microscreening to restrict an amount of water that can reach the first sensor.

18. The system set forth in claim 11, further comprising at least one of a compressed gas chamber, a pressurized gas chamber, a compressor mechanism, a valve and an air pump, for rapidly inflating the expansible chamber.

19. The system set forth in claim 11, having at least two expansible chambers.

20. The system set forth in claim 11, wherein the controller is configured to provide means to override the filling of the expansible chamber through at least one of means for activating inflation of the expansible chamber and means for deactivating the system.

21. The system set forth in claim 11, further comprising a mechanism for detaching the expansible chamber from the vehicle and deflating the expansible chamber after inflation.

22. An apparatus, for attachment to a vehicle, comprising:
- a first sensor configured to sense ambient conditions used to determine whether the vehicle is being immersed in water, and outputting signals representative of the ambient conditions;
- an auxiliary sensor configured to sense at least one of vehicle conditions and additional ambient conditions, used in determining whether the water sensed by the first sensor presents a hazardous condition, and outputting signals representative of the vehicle conditions and additional ambient conditions;
- a sensor housing that surrounds the first sensor and includes a barrier to restrict communication of the first sensor with the ambient conditions;
- an expansible chamber configured to increase buoyancy of the vehicle when filled with a gas; and
- a controller linked to the first sensor and the auxiliary sensor for processing the sensor signals to determine whether the vehicle is being immersed in water and whether the immersion in water presents a hazardous condition, the controller causing the expansible chamber to be filled with a gas when the controller determines that the vehicle is being immersed in water and that the immersion in water is a hazardous condition, and configured to provide means to override the filling of the expansible chamber through at least one of means for activating inflation of the expansible chamber and means for deactivating the system.

* * * * *